United States Patent [19]

McVay et al.

[11] Patent Number: 4,865,355
[45] Date of Patent: Sep. 12, 1989

[54] PIPE BLOCKING SYSTEM

[76] Inventors: Roger S. McVay; Steven R. McVay; W. E. Brooks, Jr., all of P.O. Box 306, Satsuma, Ala. 36572

[21] Appl. No.: 167,388

[22] Filed: Mar. 14, 1988

[51] Int. Cl.⁴ .............................................. F16L 27/12
[52] U.S. Cl. ...................................... 285/32; 285/89; 285/175; 285/422; 138/94
[58] Field of Search .................... 285/19, 20, 422, 175, 285/31, 89, 32, 92, 150; 138/94

[56] References Cited

U.S. PATENT DOCUMENTS

| | | | |
|---|---|---|---|
| 18,669 | 11/1857 | Bartol | 285/19 |
| 1,615,536 | 1/1927 | Delmar | 285/32 |
| 2,464,755 | 10/1949 | Smith | 265/32 X |
| 3,079,179 | 2/1963 | Niemoth | 285/150 X |
| 3,560,027 | 2/1971 | Graham | 285/150 |
| 4,098,451 | 7/1978 | Smith et al. | 285/31 X |
| 4,664,419 | 5/1987 | Tam et al. | 285/31 |

Primary Examiner—Dave W. Arola
Attorney, Agent, or Firm—George L. Williamson

[57] ABSTRACT

An apparatus is provided for blocking off process lines between various pieces of processing equipment, for example, storage tanks, wherein a block housing is provided having pipes on opposite faces thereof connected to the processing vessels. Means are provided for blocking the flow using an axial expansion means for insertion into seats provided on opposite faces of the block housing. During periods of time of normal operation, i.e., when blocking of the process lines is not desired, a flow-thru pipe assembly having male and female ends thereto and locking means provided thereto is provided for insertion into the block housing and for mating and joining the opposite pipes on the opposite faces of the block housing.

4 Claims, 4 Drawing Sheets

PIPE BLOCKING SYSTEM

BACKGROUND OF THE INVENTION

The present invention generally relates to the field of pipe couplings, pipe fittings and/or pipe coupling systems. More particularly, the present invention provides a new and novel method of blocking off industrial vessels, e.g., blocking off storage tanks from processing lines.

Pipe couplings unlike those described in the present invention have been described in the prior art. In U.S. Pat. No. 4,690,434, Schmidt, described a coupling for joining the ends of unthreaded pipe sections. In U.S. Pat. No. 2,419,069, Griffin, described an invention relating to pipe fittings for controlling the passage of fluids comprising two short spaced longitudinally aligned pipe sections. In U.S. Pat. No. 3,516,688, Gachot, described a pipe coupling system which was the demountable and convertible for the purpose of joining two elements of a same pipe connected by tie bolts spaced about the axis of the pipe.

While the devices discussed previously herein have been described in the prior art, none of them contain the unique and novel features of the present invention.

SUMMARY OF THE INVENTION

The present invention describes a device and method to economically and easily block all the process lines entering various types of process vessels, e.g., storage tanks, which are found on industrial sites.

The present invention is comprised of a housing having pipes attached to opposite sides thereof and having two different types of removable sections therein. One type of removable section is comprised of two parts therein, one in the form of a male cylindrical flow-thru pipe section and the second in the form of a female cylindrical flow-thru pipe wherein the two pipe sections can be detached from the housing's pipes. The second type of removable section is a safety blocking device having blocking means such as machine fitted sealing blocks or bushings on each end of an axial expansion means for plugging the two pipes attached to opposite sides of the block housing. The plugging occurs so that the sealing bushings allow no leakage of materials or liquids from the housing's pipes.

Industrial safety practices dictated by federal agencies such as OSHA, for example, require that when a person is entering a processing vessel all process lines supplying fluids to the vessel must be blocked are blanked off. The current method widely used for doing this is simply to break the pipe flanges, drive wedges between the flanges, insert a blank piece of metal therein, and bolt the flanges back together. This requires experienced maintenance personnel and is very time consuming, furthermore, at times because of the corrosive atmosphere the pipes might exist in, it required burning used and/or spent corroded bolts off the flanges. Burning the bolts off in some industrial environments can require additional safety personnel and present numerous safety problems, e.g., fire and/or explosion.

Therefore, an objective of the present invention is to provide a means of blanking off process lines from process vessels which provides the utmost safety to personnel and equipment. Furthermore, an objective of the present invention is to provide an economical and easily accomplished method of blocking off processing lines from processing vessels. The present invention is designed so that unskilled personnel can perform the entire task of blocking off the processing lines in a much reduced time. An additional objective of the present invention is that it allows blocking off of processing lines by a means wherein the line itself can be left in the blocked position without reopening it.

DESCRIPTION OF THE PREFERRED EMBODIMENTS

Figure 1:
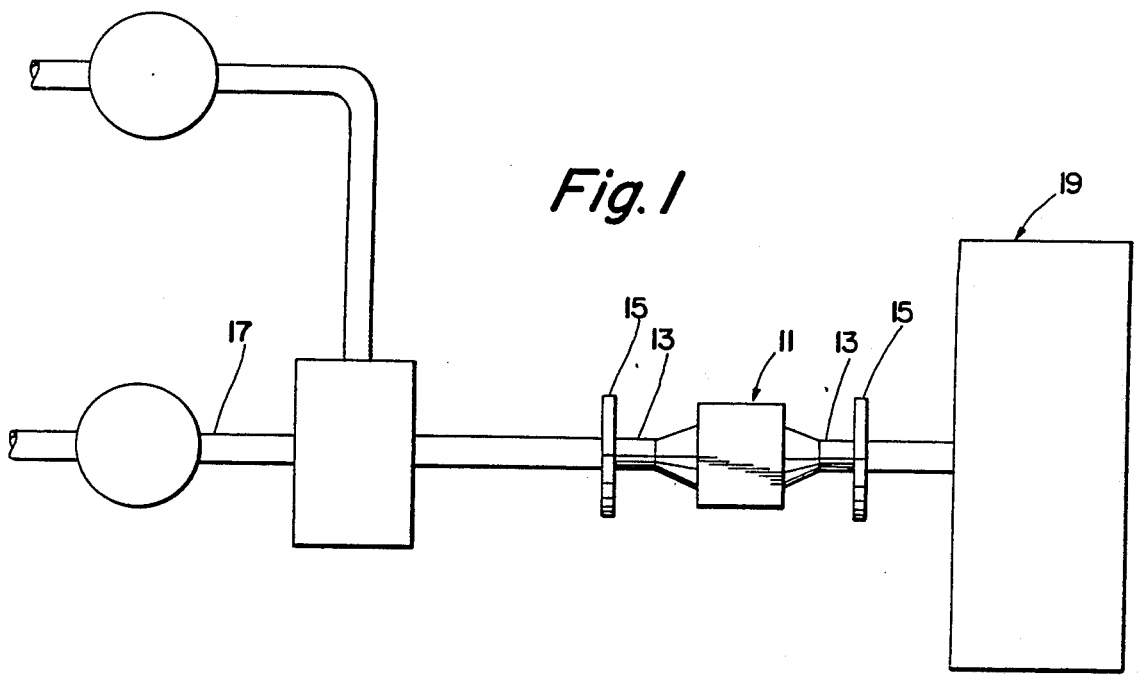
FIG. 1 is a schematic view of the block housing shown in operative connection.

Turning now to FIG. 1, there is shown a schematic of a processing system to which the present invention is applicable there to. The block housing or housing is shown at 11, the block housing or housing has pipes connected to opposite ends thereof at 13, and flanges provided thereto at 15, and process lines are shown on opposite ends of the block housing at 17. The block housing is anticipated to be inserted between processing vessels such as a tank shown at, 19, or a valving system shown at 21.

Figure 2:
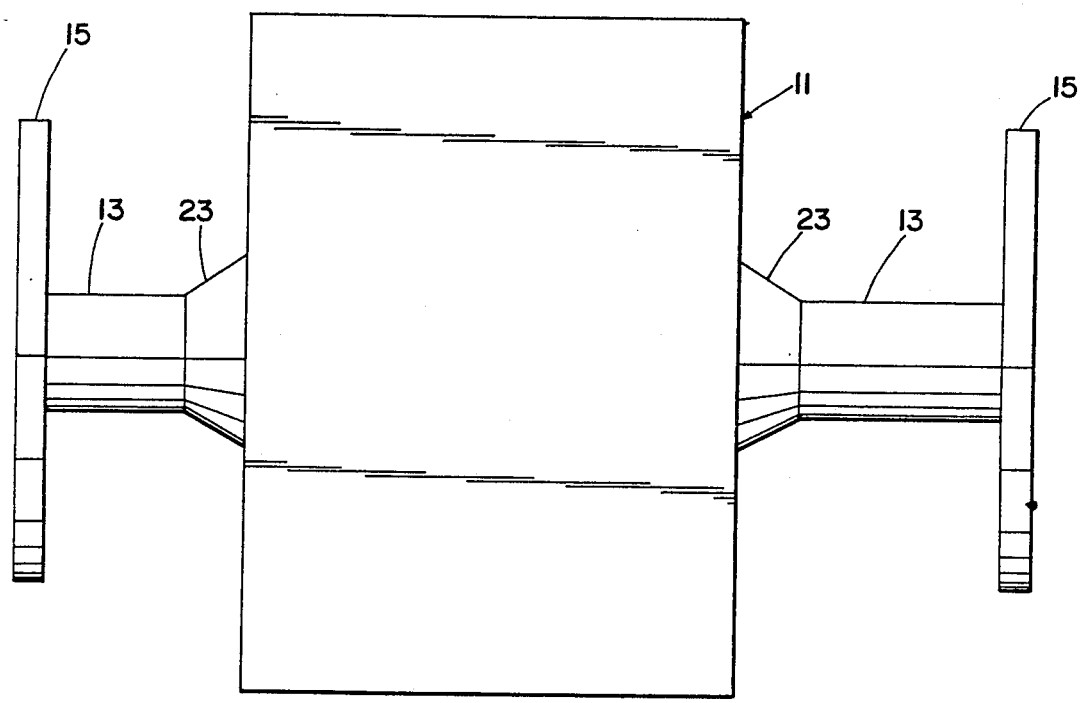
FIG. 2 is a view of the block housing.

Turning to FIG. 2, there is shown an elevation view of the block housing. The housing is shown at 11 having a cavity and pipes connected to its opposite ends at 13, and flanges connected thereto at 15, furthermore, there is shown the seats provided orifices in opposite faces or sides of the block housing at 23 for insertion of sealing blocks or bushings of a flow-thru piping and safety blocking system to be described hereafter.

Figure 3:
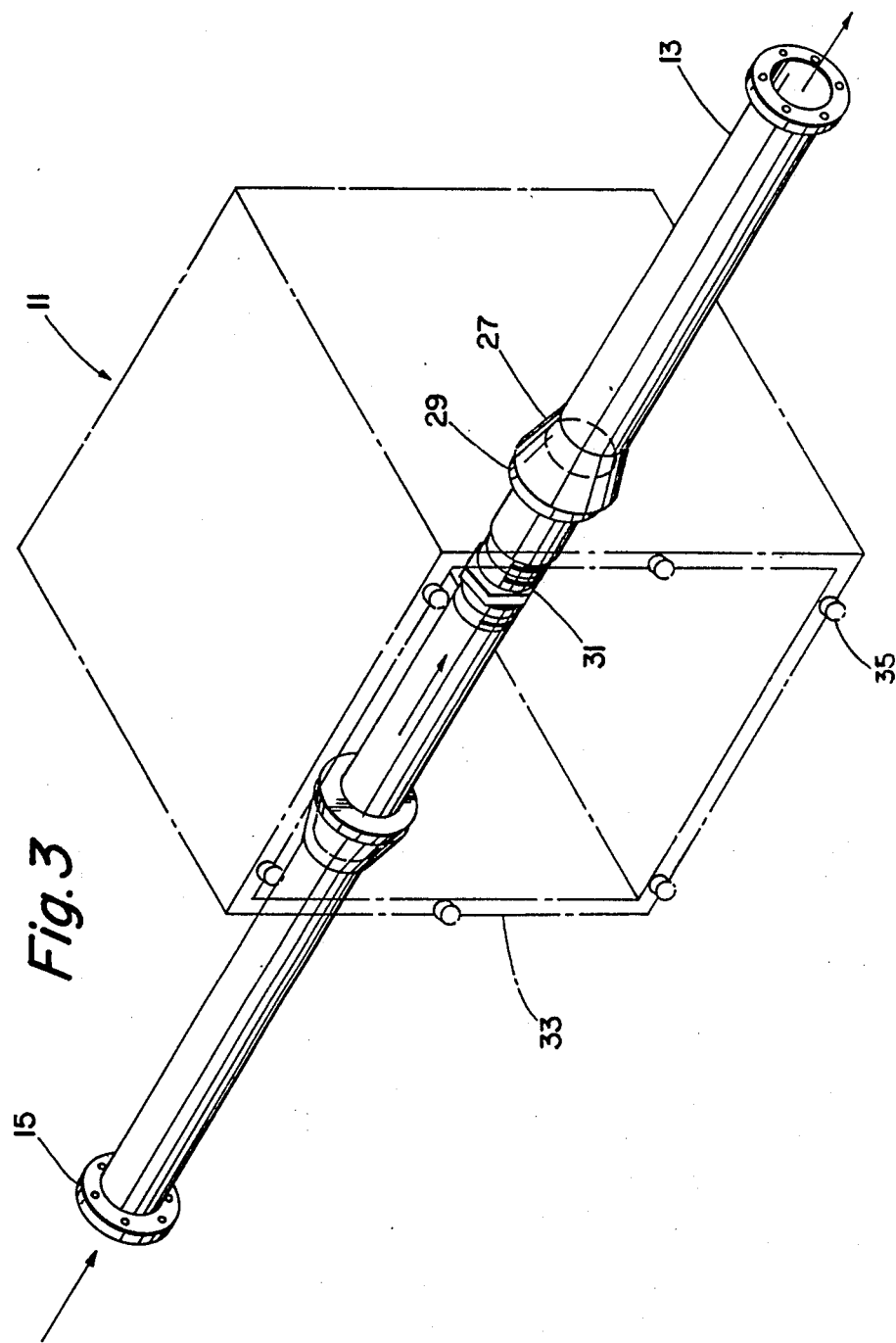
FIG. 3 is a perspective drawing of the block housing showing the flow-thru pipe in operative connection.

Turning to FIG. 3, there is shown an exemplary view of a block housing at 11, pipes connected to opposite ends at 13, having flanges thereon at 15. Furthermore, there is shown seats provided for a thru pipe assembly at 23. Furthermore, in FIG. 3 there is shown a thru pipe assembly at 25, having a male portion shown at 25 and a female portion shown at 27, the ends of said portions of said thru pipe being provided with sealing blocks or bushings, 29 on each end for insertion into the seat, at 23, to provide a non-leaking fitting between the opposite ends of the thru pipe and the processing line, 13. Furthermore, a locking nut is shown at 31 for firmly connecting the thru pipe assembly into the seats provide on opposite sides of the block housing, 11. Furthermore in FIG. 3, there is provided a cover for the block housing at 33 and attachment means for connecting said cover to said block housing at 35.

Figure 4:
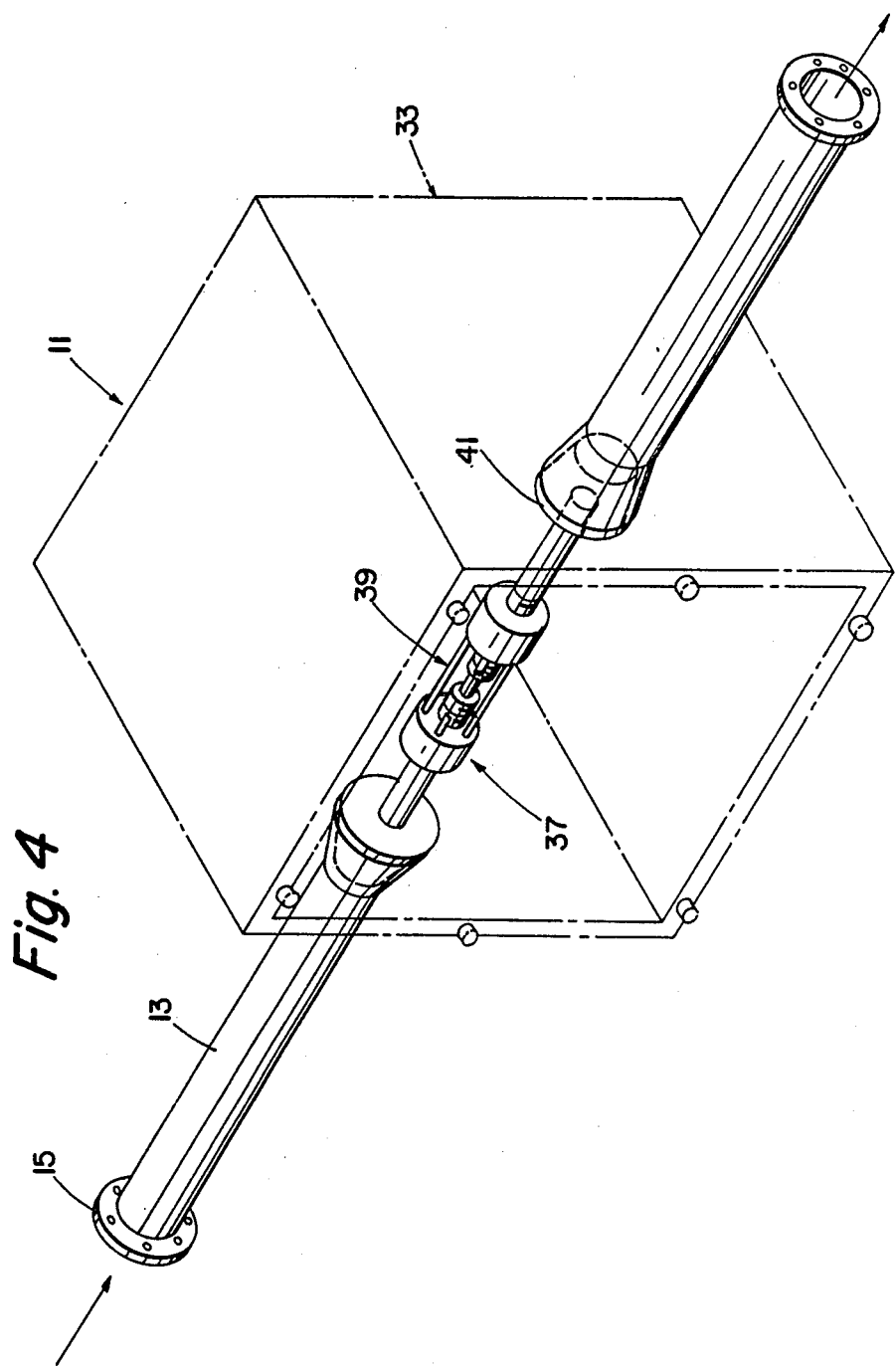
FIG. 4 is a perspective drawing of the block housing showing the safety blocking mechanism in operative connection.

Turning to FIG. 4, there is shown the general features of the block housing assembly at 11 and the piping on opposite ends thereof at 13. There is shown the seats on opposite sides of the block housing at 23. In FIG. 4 there is shown the safety blocking means and/or mechanism at 37 having axial expansion means at 29. On opposite ends of the safety blocking device are machine fitted sealing blocks or bushings, 41, for blocking off the pipes of the block housing 13. The machine fitted sealing blocks 41, would more than likely be constructed of a metallic material, e.g., stainless steel. The axial expansion means, 39, could be any means providing axial expansion, e.g., a turn buckle as depicted in the present embodiment.

Figure 5:
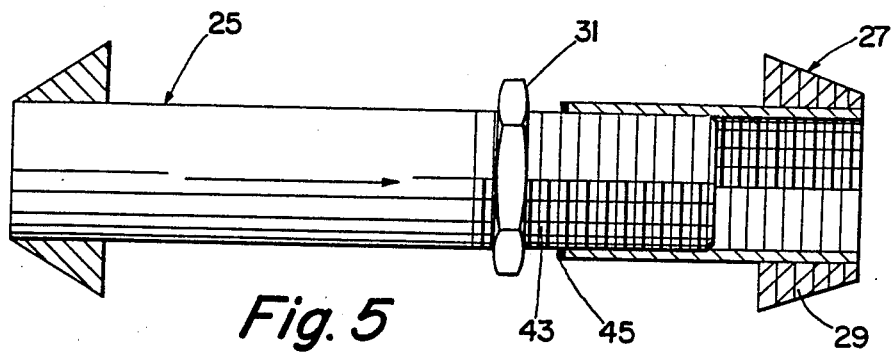
FIG. 5 is a sectional view of the flow-thru pipe.

Turning to FIG. 5, therein is shown a sectional view of the flow-thru pipe assembly wherein the male portion is shown at 25 and the female portion is shown at 27. Furthermore, the bushings on opposite ends of the flow-thru pipe assembly are shown at 29 and the locking nut on the male portion is shown at 31. Furthermore, the threads on the male portion of the thru pipe assembly are shown at 43. Additionally, it is depicted that packing glands or seals are provided at 45, to be inserted between the locking nut, 31, and the mating end of the female portion, 27, in order to provide a firm, tight and leak proof fitting between the male and female portion of the thru pipe assembly.

Figure 6:
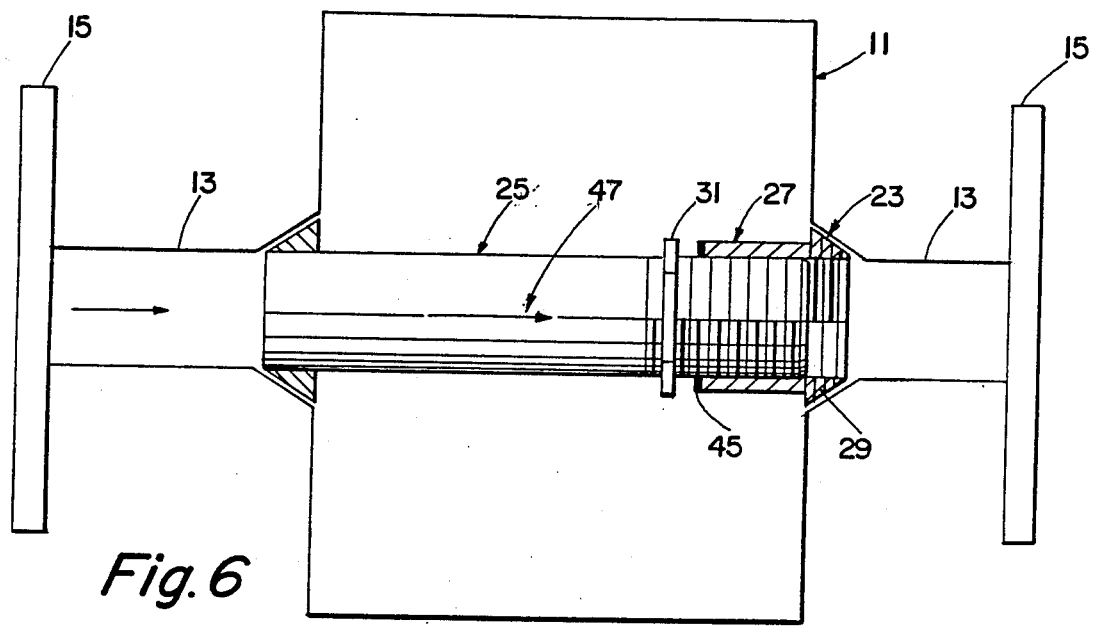
FIG. 6 is a sectional view of the block housing showing the flow-thru pipe in operative connection.

Turning to FIG. 6, therein is shown the flow-thru pipe assembly in operative connection with the block housing. Therein is shown the block housing 11, having pipes on opposite ends at 13 and flanges thereon, at 15. Furthermore the first and second seats for the thru pipe assembly are shown at 23 on opposite sides of the block housing on its internal surface. The thru pipe assembly is shown in operative connection showing the male portion at 25 and the female portion at 27. In FIG. 6, the bushings on the male and female portions of the thru pipe assembly are shown at 29 in operative connection with the seats, 23 on opposite side of the blocking housing. It is clear from FIG. 6 that material can flow through the thru pipe assembly in an unobstructed fashion while the thru pipe assembly is in operative connection. The flow of the fluid is shown schematically at 47.

Figure 7:
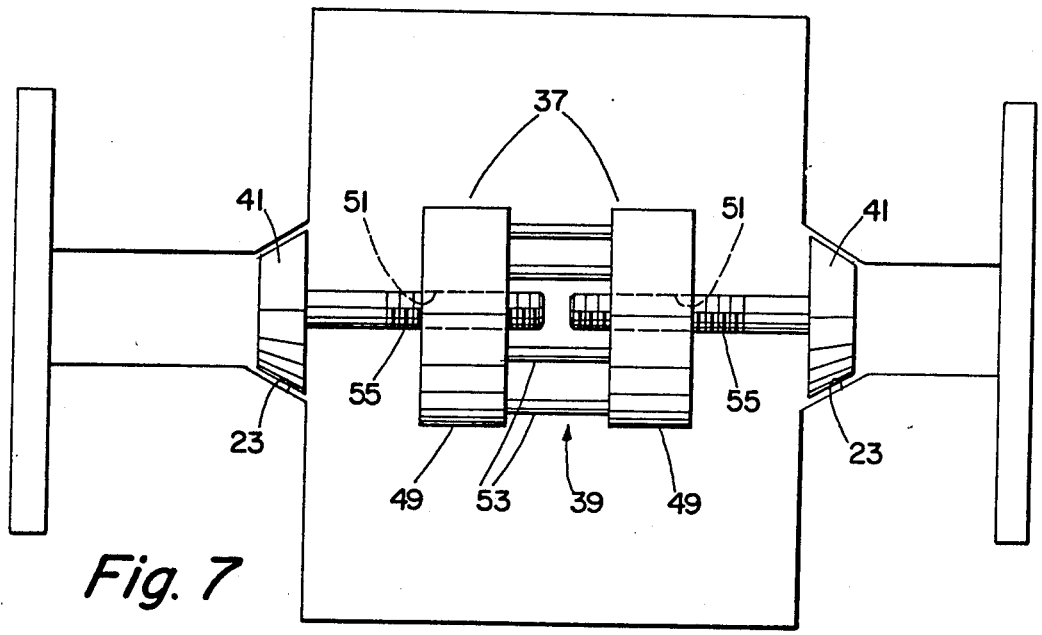
FIG. 7 is a sectional view of the block housing showing the safety blocking mechanism in operative connection.

Turning to FIG. 7 there is shown therein the same general features as FIG. 6 showing the block housing having pipes, flanges, and seats on opposite sides thereof. Furthermore, an enlarged view of the safety blocking mechanism is shown at 37 having axial expansion means at 39. Furthermore, the sealing blocks or sealing bushings are shown at 41 for insertion into the seats, 23 on opposite sides of the block housing. Again, it should be noted that the sealing bushings are precision fitted to the seats on opposite sides of the block housing in order to prevent any flow or leakage from the opposite pipes on opposite sides of the block housing. Obviously, when the safety blocking mechanism having axial expansion means is tightly inserted into the block housing no flow can occur between the pipes on opposite sides of the block housing. Furthermore, in FIG. 7 an exemplary axial expansion means is shown having opposite pieces thereto, 49, said pieces being female threaded therein, 51, and being separated by spacer bars, 53, between said opposite faces 49. Said faces are attached to threaded rods, 55, provided on and attached to the sealing blocks 41. Note that the threaded means shown at 51 and 55 are designed to have reversly manufactured threads so that the turning of the axial expansion means, 39, will force the sealing blocks, 41, to axially expanded away from each other. Thereby, the pipes on the opposite faces of the block housing are blocked and sealed tightly.

In operation, the block housing has the thru pipe assembly installed therein so that the fluids flowing in the process lines can flow in an unobstructed manner as would be the case in the normal operation of the process. However, when it became time to, for example, clean a process vessel, the fluid flow would be stopped and the block housing opened and the thru pipe assembly removed therefrom. Thereafter, the safety blocking mechanism would be inserted into the block housing and the flow of the process line would be permanently interrupted or blocked until such time as the safety blocking mechanism having axial expansion means was removed therefrom.

From the foregoing teachings, it is clear that the invention can be the economically manufactured of various materials so as to provide a convenient and easily usable improved pipe coupling. Furthermore, the foregoing teachings show that the invention can be manufactured of many types of material including metals or like materials.

The teachings of this specification are meant to be illustrative and explanatory thereof and various changes in the size, and shape and material as well as in the illustrative construction of the preferred embodiments can be made without departing from the spirit of the present invention. Many other embodiments of the invention could be easily manufactured by simply modifying the invention as herein and above described and shown in the attached drawings and following claims.

I claim:
1. An apparatus for coupling pipes comprising:
 (a) a housing;
 (b) said housing having a cavity therein;
 (c) said housing having opposite faces;
 (d) a first orifice being provided on a first said opposite faces of said housing said first orifice having an internal surface;
 (e) a second orifice being provided on a second of said opposite faces of said housing; said second orifice having an internal surface;
 (f) a first pipe being connected to said first orifice;
 (g) a second pipe being connected to said second orifice;
 (h) a first seat being provided on the internal surface of said first orifice;
 (i) a second seat being provided on the internal surface of said second orifice;
 (j) a flow thru pipe assembly;
 (k) said flow thru pipe assembly having a male portion thereto;
 (l) a bushing being provided on one end of said male portion for insertion into and sealingly engaging said first seat;
 (m) said flow thru pipe assembly having a female portion thereto;
 (n) a bushing being provided on one end of said female protion for insertion into and sealingly engaging said second seat;
 (o) a first means provided for connecting said male and female portion; and
 (p) a second means being provided for locking said first connecting means.

2. The apparatus as recited in claim 1 further comprising:
 (a) said second means for locking further comprising threaded means being provided on the end of said male portion opposite it's bushing.

3. An apparatus for blocking pipes comprising:
 (a) a housing;
 (b) said housing having a cavity therein;
 (c) said housing having opposite faces;

(d) a first orifice being provided on a first of said opposite faces of said housing; said first orifice having an internal surface;
(e) a second orifice being provided on a second of said opposite faces of said housing; said second orifice having an internal surface
(f) a first pipe being connected to said first orifice;
(g) a second pipe being connected to said second orifice;
(h) a first seat being provided on the internal surface of said first orifice;
(i) a second seat being provided on the internal surface of said second orifice;
(j) a blocking means for blocking off the flow between said first and said second pipes;
(k) a first and second sealing bushing being provided on opposite ends of said blocking means for insertion into said first seat and said second seat so that a hydraulic seal is provided; and
(l) axial expansion means being provided on said blocking means.

4. The apparatus as recited in claim 3 further comprising:
(a) said axial expansion means further comprising threaded axial expansion means.

* * * * *